Figure 1:
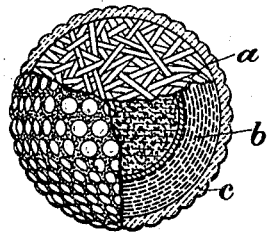

P. A. MARTIN & J. STANLEY.
GOLF BALL.
APPLICATION FILED AUG. 20, 1910.

1,022,248.

Patented Apr. 2, 1912.

WITNESSES

INVENTORS
Patrick A. Martin,
John Stanley,
By James L. Norris
Atty.

UNITED STATES PATENT OFFICE.

PATRICK ALPHONSUS MARTIN, OF BIRMINGHAM, AND JOHN STANLEY, OF SPARKHILL, NEAR BIRMINGHAM, ENGLAND.

GOLF-BALL.

1,022,248.

Specification of Letters Patent.

Patented Apr. 2, 1912.

Application filed August 20, 1910. Serial No. 578,181.

*To all whom it may concern:*

Be it known that we, PATRICK ALPHONSUS MARTIN, governing director of Martins-Birmingham, Limited, of Granville street, Birmingham, England, and JOHN STANLEY, of 137 Ivor road, Sparkhill, near Birmingham, England, engineer, subjects of the King of Great Britain, have invented certain new and useful Improvements in Golf-Balls, of which the following is a specification.

This invention has relation to golf balls of the kind in which soft soap or other colloid or gelatinous substance is used to form the core or center of the ball and is compressed and made highly resilient by the application of tense-wound wrappings or windings to the said core, and has for its object, to produce a core which is suitable for use in that class of balls which are slightly smaller in size than, but are of the same weight as, the ordinary size ball. Soft soap, (or like material) has the advantage of being a good lubricant for the tensioned rubber windings or compression wrappings of the core, and furthermore, when soft soap is used, the core cannot harden or set so that a ball so made does not deteriorate in keeping but is always "alive" or in a condition for developing resilient activity when played.

According to the present invention, we still prefer to use soft soap or similar compressible material as the basis of the core and so obtain the lubricating and non-setting advantages attendant upon such use, while in order to admit of a smaller core of higher specific gravity or relatively greater weight being produced, we propose to add to or intermix with the soap or like basis or filling, a suitable quantity of blacklead, French chalk, French clay, oxid of zinc, red-lead, or other metallic oxids, white lead, powdered slate, starch powder, sulfate of barytes, magnesium carbonate, fullers' earth or other weighting material which is also of a non-gritty character, or is capable of being introduced in the form of an absolutely impalpable powder, so that its addition will not detrimentally affect the lubricating characteristics of the basis material, nor tend to cause the same to set or harden, but will, on the other hand, coöperate with or assist the said core-basis in lubricating the tensioned rubber wrappings of the core and in providing for the production of a ball having a core-filling of relatively higher specific gravity than is usual in core of the ordinary size. Such weighting materials of an absolutely impalpable or lubricating character may also be added to or embodied in ball-cores or fillings such as size, isinglass, gelatin, starch paste, or similar compressible jelly-like substances.

Figure 2:
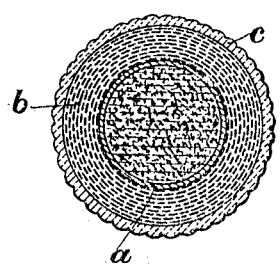
Figure 3:
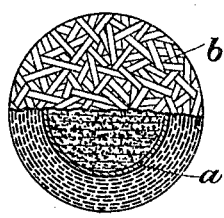
Figure 4:
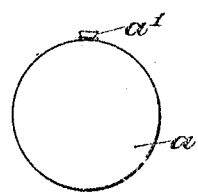

In making up a ball having a core-filling of the composite material formed by the incorporation of a weighting powder with the basis material, a sufficient quantity of the compressible composition is used to insure that when compressed by the tension windings, it will produce a ball of high elasticity and resilience. This appropriate quantity of composition is preferably forced into a small rubber bag or elastic receptacle *a*, as shown in Figures 1 to 4 of the accompanying drawing, having an opening at *a'* to provide for the introduction of filling material. One preferred and practical proportion of materials for the core consists of one pound of soap to one to three pounds of barytes, according to the required weight. When the whole of the said material has been forced in, the receptacle is tied up and the ball center (Fig. 4) thus produced is much larger than required in the finished ball. The said center is then wound down and compressed into a hard and resilient body by the application of tense-wound rubber thread *b*, to a suitable thickness, thereby producing the complete core which, though smaller in size, is of the correct weight by reason of the added proportion of weighting substance in the filling composition, while its density and hardness and consequently its resilience, is dependent upon the degree of compression applied by the tensioned wrappings. The completed core is inclosed, as usual, in a gutta covering *c*, as represented in Figs. 1 and 2 which show sections of the complete ball.

Having fully described our invention, what we desire to claim and secure by Letters Patent is:—

1. A golf ball having a core composed of a compressible colloid substance incorporated with a weighting material which will not interfere with the lubricating properties thereof, and an elastic-tensioned winding enveloping such core and maintaining the same under compression to reduce its size and increase its density.

2. A golf ball having a core composed of a compressible colloid substance incorporated with a weighting material in the form of an impalpable nonabsorbent powder, and an elastic-tensioned winding enveloping such core and maintaining the same under compression to reduce its size and increase its density.

In testimony whereof we have hereunto set our hands in presence of two subscribing witnesses.

PATRICK ALPHONSUS MARTIN.
JOHN STANLEY.

Witnesses:
HY. SKERRETT,
HENRY NORTON SKERRETT.